United States Patent
Burdick et al.

(10) Patent No.: US 9,996,393 B2
(45) Date of Patent: Jun. 12, 2018

(54) DYNAMIC VIRTUAL PROCESSOR MANAGER

(71) Applicant: International Business Machines Corporation, Armonk, NY (US)

(72) Inventors: Dean J. Burdick, Frisco, TX (US); Bruce Mealey, Austin, TX (US); Bret R. Olszewski, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/945,841

(22) Filed: Nov. 19, 2015

(65) Prior Publication Data
US 2017/0147410 A1    May 25, 2017

(51) Int. Cl.
*G06F 9/455* (2018.01)
*G06F 9/46* (2006.01)
(Continued)

(52) U.S. Cl.
CPC ............. *G06F 9/50* (2013.01); *G06F 9/455* (2013.01); *G06F 9/45533* (2013.01); *G06F 9/45558* (2013.01); *G06F 9/48* (2013.01); *G06F 9/4806* (2013.01); *G06F 9/4843* (2013.01); *G06F 9/4856* (2013.01); *G06F 9/5005* (2013.01); *G06F 9/505* (2013.01); *G06F 9/5011* (2013.01); *G06F 9/5022* (2013.01); *G06F 9/5027* (2013.01); *G06F 9/5077* (2013.01); *G06F 9/5083* (2013.01); *G06F 9/5088* (2013.01); *G06F 2009/4557* (2013.01); *G06F 2009/45575* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS 6,263,359 B1    7/2001 Fong et al.
7,237,242 B2    6/2007 Blythe et al.
(Continued)

OTHER PUBLICATIONS

Maro et al., "Dynamically Reconfiguring Processor Resources to Reduce Power Consumption in High-Performance Processors," Power-Aware Computer Systems, Jun. 11, 2001, p. 97-111, LNCS vol. 2008, Springer-Verlag Berlin Heidelberg.
(Continued)

*Primary Examiner* — Charles M Swift
(74) *Attorney, Agent, or Firm* — Teddi E. Maranzano

(57) ABSTRACT

A method, program product, and system is provided for dynamic virtual processor management in a computer having a plurality of concurrent multi-threaded physical processors. A workload is assigned to a first virtual processor manager pool based on a virtual processor manager mode of the first virtual processor manager pool. A current utilization ratio and a response time ratio for the workload are calculated. The workload is dynamically moved to a second virtual processor manager pool based on either the current utilization ratio or the response time ratio exceeding a configurable threshold. The workload is dynamically moved between virtual processor manager pools to realize target performance metric requirements.

18 Claims, 4 Drawing Sheets

(51) Int. Cl.
  *G06F 15/173* (2006.01)
  *G06F 9/50* (2006.01)
  *G06F 9/48* (2006.01)

(56) References Cited

U.S. PATENT DOCUMENTS

| | | | |
|---|---|---|---|
| 2004/0139434 A1* | 7/2004 | Blythe | G06F 9/505 718/100 |
| 2008/0104296 A1* | 5/2008 | Blackmore | G06F 9/4812 710/267 |
| 2009/0217276 A1* | 8/2009 | Brenner | G06F 9/4856 718/102 |
| 2011/0061057 A1* | 3/2011 | Harris | G06F 9/5072 718/104 |
| 2011/0185064 A1* | 7/2011 | Head | G06F 9/5077 709/226 |
| 2011/0247001 A1* | 10/2011 | Smith | G06F 9/5011 718/104 |
| 2012/0204186 A1* | 8/2012 | Davidson, II | G06F 9/5077 718/104 |
| 2012/0324112 A1* | 12/2012 | Dow | G06F 9/5077 709/226 |
| 2013/0067467 A1* | 3/2013 | Aslot | G06F 9/45558 718/1 |
| 2013/0179616 A1* | 7/2013 | Accapadi | G06F 9/4812 710/269 |
| 2014/0025823 A1* | 1/2014 | Szabo | H04L 43/16 709/226 |
| 2014/0208331 A1 | 7/2014 | Li et al. | |
| 2014/0229610 A1 | 8/2014 | Shen et al. | |
| 2014/0331222 A1* | 11/2014 | Zheng | G06F 9/5077 718/1 |
| 2015/0121377 A1* | 4/2015 | Zang | G06F 9/45558 718/1 |
| 2015/0169350 A1* | 6/2015 | Anand | G06F 9/45558 718/1 |
| 2015/0372878 A1* | 12/2015 | Ganesan | H04L 43/16 709/223 |
| 2016/0139942 A1* | 5/2016 | Tsirkin | G06F 9/45558 718/1 |

OTHER PUBLICATIONS

VMware, "Poor Virtual Machine Application Performance May Be Caused by Processor Power Management Settings (1018206)," VMware Knowledge Base, Last Updated on Aug 10, 2015, p. 1-3, http://kb.vmware.com/selfservice/microsites/search.do?language=en_US&cmd=displayKC&externalId=1018206, Accessed on Oct. 27, 2015.

* cited by examiner

DYNAMIC VIRTUAL PROCESSOR MANAGER

BACKGROUND

Embodiments of the present invention relate generally to the field of computer performance, and more particularly to virtual processor management using a dynamic virtual processor manager.

Server virtualization is the partitioning of the resources of a physical server into multiple entities referred to as virtual servers or logical partitions. Each virtual server acts as if it were a separate physical server, including independently executing distinct workloads (i.e., one or more applications) and operating systems. The virtual servers can be defined as dedicated or shared. A dedicated partition receives exclusive use of the configured resource. For example, the processors allocated to the dedicated partition are unavailable for use by another partition, even if one or more of the allocated processors in the dedicated partition is idle. By contrast, a shared partition receives its processor allocation from a pool of physical processors, also referred to as a shared processor pool, from which other shared partitions receive their processor allocations. Each physical processor (CPU) in the shared processor pool is logically subdivided into portions called virtual processors. The physical server's virtual machine monitor, also referred to as a hypervisor, manages virtual processors in the shared processor pool. Each shared partition receives its allocation as a number of virtual processors. In contrast with the dedicated partition, the hypervisor may add or remove virtual processors from a shared partition depending on the processing needs of the shared partition and in relation to the processing needs of the other shared partitions. In this way, the physical processors are efficiently utilized.

Various operating system tuning parameters can be manually adjusted to achieve a desired performance level, such as throughput, response time, and processor utilization. One such parameter adjusts the number of threads per virtual processor to cause the hypervisor to dispatch only the required virtual, and the underlying physical, processors to achieve the performance goal. Determining an appropriate parameter setting is a manual and iterative process that requires that a systems administrator gather and analyze historic performance data for the workload. However, when workload performance is not consistently predictable, determining optimal parameter settings may require several manually applied approximations.

A virtual processor manager that dynamically samples and analyzes virtual processor utilization and proactively adjusts to changing partition performance metrics may achieve and maintain the desired performance while reducing power consumption to idle physical processors.

SUMMARY

According to one embodiment, a method for dynamic virtual processor management in a computer having a plurality of concurrent multi-threaded physical processors is provided. The method includes assigning a workload to a first virtual processor manager pool based on a virtual processor manager mode of the first virtual processor manager pool. The method includes calculating a current utilization ratio and a response time ratio for the workload, and dynamically moving the workload to a second virtual processor manager pool based on either the current utilization ratio or the response time ratio exceeding a configurable threshold.

According to another embodiment, a computer program product for dynamic virtual processor management in a computer having a plurality of concurrent multi-threaded physical processors includes a VPM of a computer operating system embodied on a computer readable storage medium, the VPM including program instructions executable by a processor. The program instructions include program instructions to assign a workload to a first virtual processor manager pool based on a virtual processor manager mode of the first virtual processor manager pool. The computer program product includes program instructions to calculate a current utilization ratio and a response time ratio for the workload, and program instructions to dynamically move the workload to a second virtual processor manager pool based on either the current utilization ratio or the response time ratio exceeding a configurable threshold.

In another embodiment, a computer system for dynamic virtual processor management in a computer having a plurality of concurrent multi-threaded physical processors is provided. The computer system includes one or more processors, one or more computer-readable storage devices, and a plurality of program instructions stored on at least one of the one or more storage devices for execution by at least one of the one or more processors. The plurality of program instructions includes program instructions to assign a workload to a first virtual processor manager pool based on a virtual processor manager mode of the first virtual processor manager pool. The computer system includes program instructions to calculate a current utilization ratio and a response time ratio for the workload and program instructions to dynamically move the workload to a second virtual processor manager pool based on either the current utilization ratio or the response time ratio exceeding a configurable threshold.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computer performance, and more particularly to virtual processor management using a dynamic virtual processor manager (VPM).

The following described exemplary embodiments provide a system, method and program product having the capacity to improve the technical field of computer performance by more closely aligning performance requirements to the number of active physical processors required to dispatch virtual processors. Unnecessary physical processors are idled, to consume minimum amount of energy, until the workload demands activation of additional physical processors, to dispatch additional virtual processors.

A VPM that dynamically samples and analyzes virtual processor utilization and proactively adjusts to changing partition performance metrics may achieve and maintain the desired performance while reducing power consumption to idle physical processors.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
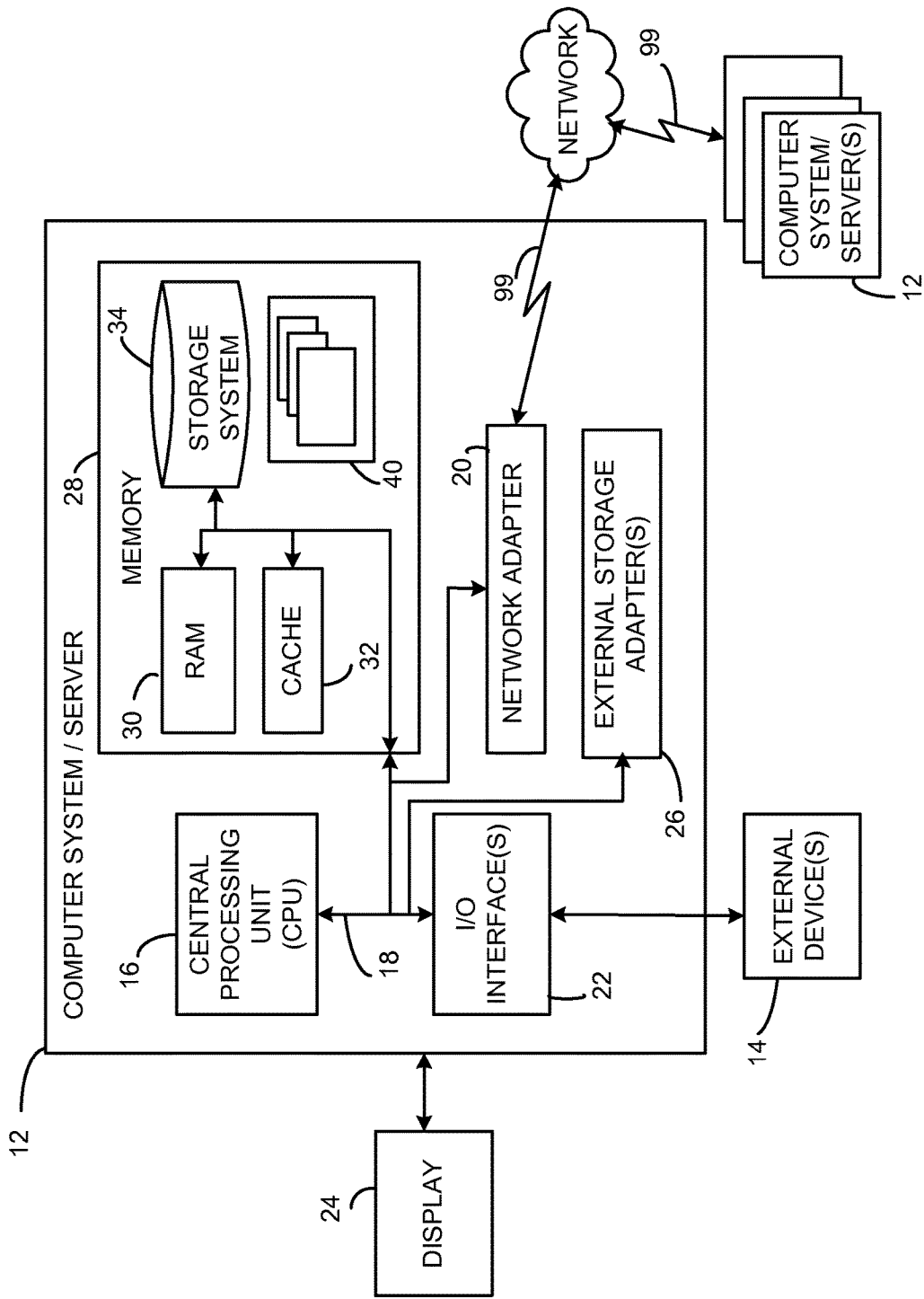
FIG. 1 illustrates an exemplary computer system environment operable for various embodiments of the disclosure.

FIG. 1 illustrates a block diagram of an exemplary computer system (i.e., server) 12 operable for various embodiments of the disclosure. As shown, the server 12 is only one example of a suitable computer for implementing a dynamic VPM and is not intended to suggest any limitation as to the scope of use or functionality of embodiments of the disclosure described herein.

The server 12 may be a standalone machine or a logical partition (LPAR) on physical host. When practiced in a distributed computing environment, tasks may be performed by both local and remote servers 12 that are linked together and communicate through a communications network, such as the network 99.

A hardware management control point communicates through network 99 with the individual server 12, or with the servers 12 that are defined to a clustered server environment. For example, the computer workstation 920 (FIG. 4) may provide the administrative interface for various hardware and system management functions, such as logical partitioning, applying firmware and other software updates, and powering hardware components on and off. A specialized operating system of the hardware management control point accepts administrator input, which is converted to commands and parameters that, in turn, are input to the hypervisor 240 (FIG. 2) to perform the desired system operations. Exemplary input includes commands to configure the physical processors into one or more shared processor pools and to assign a logical partition to a shared processor pool.

The server 12 may be described in the context of executable instructions, such as a program, or more specifically, an operating system (OS) 40 that is an aggregate of program modules, components, objects, logic, or data structures, for example, being executed by the processing unit 16 to control the operation of the server 12. At least a portion of the OS 40, may be specialized to execute the algorithm of FIG. 3. For example, the OS 40 may accept configuration parameters to set performance thresholds and to assign an application to a shared processor pool based on comparing a performance threshold to a performance goal. The OS 40 may communicate with a hardware control point, or other management workstation and may accept configuration parameters for one or more applications, or for all applications executing in the OS 40 instance in the logical partition.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. As will be discussed with reference to FIG. 4, server 12 may include internal components 800 and external components 900, respectively.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

External storage adapter 26 connects the server 12 with external storage subsystems. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
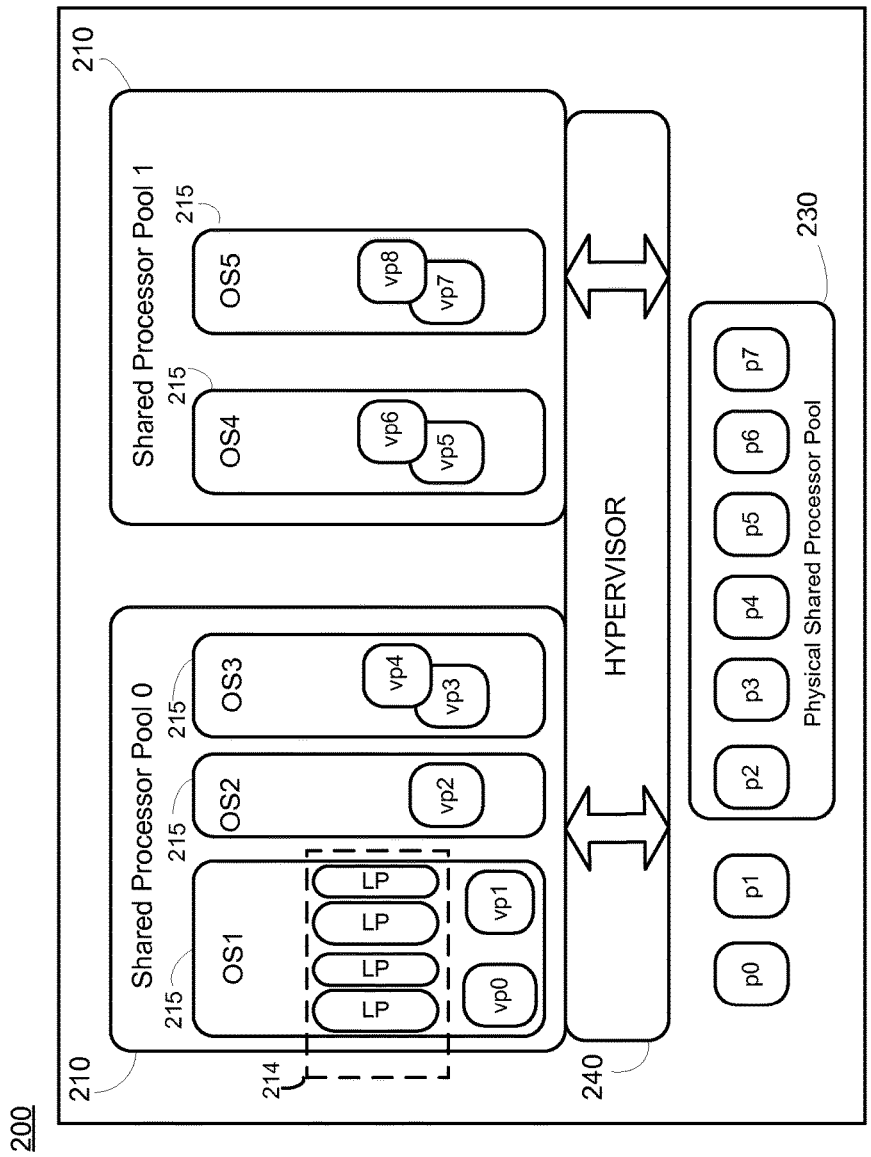
FIG. 2 illustrates logical partitions in a shared processor pool environment, according to various embodiments of the disclosure.

FIG. 2 illustrates several logical partitions in a shared processor pool (SPP) environment 200. One skilled in the art of computer architecture can appreciate that the algorithm described with reference to FIG. 3 below can be practiced in any hardware platform having physical processors that are multi-threaded. However, various embodiments of the present disclosure will be discussed with reference to the IBM® Power Architecture®, including the IBM® POWER Hypervisor™, and the IBM® AIX® operating system.

The SPP environment 200 includes eight physical processors, p0 through p7. Physical processors p2 through p7 are assigned to the physical shared processor pool (PSPP) 230. Each physical processor in the PSPP 230 is logically subdivided into portions called virtual processors (VP). Therefore, the VP is a logical abstraction representing a portion of the capacity of a physical processor. The number of VPs per physical processor depends on the architectural implementation of the hardware. Physical processors p0 and p1 are assigned to a dedicated partition (not shown) and are therefore not available to donate capacity to the PSPP 230. A physical processor donates all of its capacity to the PSPP 230 unless it is dedicated to an active partition.

The SPP environment 200 shows two SPPs 210, but more or fewer SPPs 210 can be configured depending on the architectural implementation. An SPP is a grouping of virtual processors that may grouped together to control the processor capacity that can be consumed from the PSPP 230, for example by capping workloads to a maximum CPU utilization. SPP "0" contains three active partitions 215 running OS1, OS2, and OS3, respectively. SPP "1" contains two active partitions 215 running OS4 and OS5, respectively. The active partitions 215 are assigned to an SPP based on capacity requirements of the active partition 215, for example to limit CPU utilization for the purposes of conforming to software license agreements.

The hypervisor 240 manages the capacity from the PSPP 230, including logically subdividing the physical processors into VPs, allocating the VPs to the SPPs 210 and allocating VPs from the SPPs 210 to active partitions 215. In the SPP environment 200, nine VPs (vp0 through vp8) are portioned from six physical processors (p2 through p7). The VP is a logical abstraction representing a portion of the capacity of a physical processor. The hypervisor 240 can dynamically create additional VPs from each of the physical processors in the SPP 230, up to the architectural limit. In this example, the hypervisor 240 allocates two VPs to the active partition 215 running the operating system OS1. The hypervisor 240 also manages dynamically activating and deactivation (i.e., folding) VPs based on the utilization of their capacity being above or below, respectively, a configured threshold. The hypervisor 240 similarly activates and deactivates (i.e., folds) physical processors based on their utilization.

The hypervisor 240 may dispatch one or more concurrent hardware threads for each physical processor, depending on the architectural implementation. For example, the IBM® POWERS® processor can dispatch up to eight hardware threads per physical processor. The hardware threads are dispatched using a VP. When the VP is dispatched to a physical processor, the hardware threads are also dispatched. An operating system, such as AIX, that has the capability to communicate with the hypervisor 240 to alter its share of hardware resources can set an operating system configuration parameter to specify the desired number of hardware threads, depending on the performance goals for the applications (i.e., workload). The hardware threads appear as logical processors to the operating system. As shown, in active partition 215 the operating system OS1 has two VPs allocated. In this example, based on an iterative process of gathering and analyzing performance data for the applications in OS1, two hardware threads are required per physical processor. The operating system sees four logical processors, two (the hardware threads) per each VP, shown here as LPs 214. Logical processor allocations are not shown for the remaining active partitions 215.

The SPP environment 200 supports processor folding, which is a mechanism to improve scheduling efficiency and energy consumption by activating only the physical processors that are needed to process the application or partition workload. Processor folding compresses workloads to fewer physical processors, based on physical processor utilization, by hibernating the remaining physical processors.

The processor folding mechanism, referred hereinafter as VPM, may be implemented as a subsystem of an operating system, such as AIX. In an embodiment, VPM may be added to a non-AIX operating system, such as Linux® (Linux is the registered trademark of Linus Torvalds in the United States, other countries, or both), to provide compatibility with the Power Architecture and to enable the non-AIX operating system to exploit simultaneous multi-threading and hardware thread dispatching, among other features, of the Power Architecture. VPM behavior, referred to as the VPM mode, may be selected through an operating system configuration parameter, such as a parameter to the scheduler. The VPM may dynamically change the VPM mode from one VPM mode to another in response to workload requirements and performance goals. How the hardware threads are dispatched and distributed on the VPs characterizes the difference between the behaviors of the VPM modes. The VPM mode may be set using a number to represent the desired number of hardware threads to distribute among the VPs (e.g., "1," 2", "4"). In an embodiment, any value may be used to indicate a VPM mode, including text. The number of VPM modes and their behaviors may vary between processor architecture implementations. In an embodiment, a VPM mode may provide compatibility between Power Architecture and non-Power Architecture implementations. In another embodiment, a VPM mode may provide compatibility between different processor models within the Power Architecture family, such as between Power8 and Power7.

Determining an optimal VPM mode setting may include gathering and analyzing historic performance data to attempt to accurately predict future performance. In an embodiment, an operating system parameter may specify the threshold physical processor utilization, for example as a percentage, beneath which a VP is folded, or above which an idle VP is unfolded. Processor folding interacts with the generic operating system scheduling of software threads to the available hardware threads (i.e., logical processors) by calculating the total consumption of the physical processors in the active partition 215 over each scheduling interval, such as 10 milliseconds (ms), to compute the number of VPs that should be active. If there are more VPs than the workload requires to meet performance goals, the operating system scheduler may choose to dispatch software threads to only a subset of logical processors that are represented by the VPs. In subsequent scheduling intervals, the hypervisor 240 may determine that the logical processors are unused and fold the associated VPs. In subsequent scheduling intervals, the hypervisor 240 may initiate compressing workloads by moving VPs to physical processors having available capacity and hibernating the now-free physical processors. VPs are dynamically folded and unfolded based on the partition's physical processor utilization and the settings of the VPM tuning parameters and thresholds, as described below with reference to Tables 1-5. The process is reversed when more physical processors or VPs are needed as a result of increased workloads.

Those skilled in the art of performance tuning may appreciate that computer performance is a complex practice that is affected by many inter-related factors. This disclosure is described in terms of the overall performance goals of throughput, physical processor utilization (utilization), and response time to facilitate understanding of the concepts but should not be understood as limitations.

Utilization measures, usually as a percentage, the amount of time a physical processor is busy executing instructions. Utilization for a physical processor can be calculated and reported as an aggregate of all tasks (i.e., user applications and operating system tasks) executing instructions on the physical processor. In the SPP environment 200, utilization for a physical processor includes aggregating the time the hardware threads were active executing instructions on behalf of a VP. Multiple VPs from multiple active partitions 215 may execute on the same physical processor because the physical processors in the physical shared processor pool 230 share capacity among all active partitions 215. Utilization can be calculated and reported by each task, such as an application, executing on a physical processor or as an aggregate of all tasks executing instructions on the physical processor. Repeated utilization measurements point to trends in overall utilization that can be used in physical processor capacity planning.

Throughput measures transactions per second. Throughput and utilization are optimally represented as a linear relationship. For example, for a throughput of 100,000 transactions per second at 50% utilization, a 200,000 transactions per second throughput may be inferred at 100% utilization, assuming no other scaling issues unrelated to physical processor capacity.

Response time may be defined as the time it takes for an application to return a response to the requestor. Response time may include several components, such as network response time which measures the time the request/response spends in network transmission, I/O wait time, and application latency (i.e., the time it takes for application to respond), among other factors.

The metrics presented in the following Tables 1-5 are based on the Power Architecture. It should be understood that different processor architectures, including non-Power Architecture implementations, may have metrics that differ from those presented for the Power Architecture, and separate baselines for those processor architectures should be developed.

Table 1 shows an example of physical processor utilization thresholds in an architecture where four hardware threads are defined for one physical processor. In an embodiment, the threshold percentages are configurable from the operating system and from the hypervisor 240. This example assumes that the first active hardware thread can utilize up to 60% of the physical processor. If VPM calculates that a workload needs more capacity during the scheduling interval, during the next scheduling interval a second hardware thread is dispatched and can consume up to 20% of the physical processor. Similarly for each subsequent scheduling interval, if still more capacity is needed, the third and/or fourth hardware thread is dispatched and each can consume up to 10% of the physical processor. Together the four threads consume 100% of the physical processor. During each scheduling interval, VPM identifies the software thread that consumed the most physical processor time for the interval and determines whether another hardware thread should be dispatched, or another VP should be unfolded. Another VP should be unfolded when all the available hardware threads for a physical processor have been dispatched, as in the example of Table 1.

TABLE 1

Thread Utilization of One Physical Processor

| One Hardware Thread Active | Two Hardware Threads Active | Three Hardware Threads Active | Four Hardware Threads Active |
|---|---|---|---|
| 60% | 20% | 10% | 10% |

The number of VPM modes and their behaviors may vary between processor architecture implementations. Two exemplary VPM modes are hereinafter described to illustrate how hardware thread utilization affects VP folding. Additional VPM modes may be available, depending on the processor architecture implementation. Table 2 shows a VPM mode that favors high per-thread throughput and response time because a hardware thread is dispatched to each physical processor before dispatching additional hardware threads. This VPM mode keeps more physical cores unfolded because each physical core has a primary thread. In this context a primary thread is the first hardware thread dispatched to a physical processor. This mode unfolds as many physical processors as necessary to unfold all VPs. The example in Table 2 assumes two physical processors (0 and 1), each capable of dispatching four hardware threads (0-3 and 4-7).

TABLE 2

Thread Utilization with Two Threads on Two Physical Processors

| Physical Processor | Hardware Thread | Thread Utilization |
|---|---|---|
| 0 | 0 | 20% |
| 0 | 1 | 0% |
| 0 | 2 | 0% |
| 0 | 3 | 0% |
| 1 | 4 | 20% |
| 1 | 5 | 0% |
| 1 | 6 | 0% |
| 1 | 7 | 0% |

In Table 2, the active partition 215 workload is such that there are two hardware threads active in the scheduling interval, each hardware thread consuming 20% of the physical processor. As shown in Table 1, one physical processor can support the two hardware threads. Therefore, in the next scheduling interval it would be possible to select different a VPM mode that moves the second hardware thread from the second physical processor to the first physical processor, as shown in Table 3. In current operation, the move between VPM modes is a manual process.

Table 3 shows a VPM mode that favors high per-physical-processor utilization over per-thread utilization because all hardware threads are dispatched to a physical processor before unfolding additional VPs and physical processors.

TABLE 3

Thread Utilization with Two Threads on One Physical Processor

| Physical Processor | Hardware Thread | Thread Utilization |
|---|---|---|
| 0 | 0 | 20% |
| 0 | 1 | 20% |
| 0 | 2 | 0% |
| 0 | 3 | 0% |
| 1 | 4 | Folded |
| 1 | 5 | Folded |
| 1 | 6 | Folded |
| 1 | 7 | Folded |

As shown in Table 1, one physical processor can support the two hardware threads. Table 3 shows that as a result of moving hardware thread "4" to physical processor "0," physical processor "1" is folded. This allows improved throughput by increasing utilization of the physical processors. Reduced power consumption may result from activating fewer physical processors.

Table 4 shows the utilization calculated for the scheduling interval following the VPM mode change made in Table 3. If the physical processor cannot guarantee the full throughput and/or response time benefit of one or both of the software threads dispatched on the hardware threads, the VPM mode can be changed for the next scheduling interval. Hardware thread "1" exceeds the 20% threshold shown in Table 1. Therefore, changing the VPM mode for the next scheduling interval may maintain performance goals. The VPM mode is performed manually.

TABLE 4

Thread Utilization with Two Threads on One Physical Processors

| Physical Processor | Hardware Thread | Thread Utilization |
|---|---|---|
| 0 | 0 | 30% |
| 0 | 1 | 30% |
| 0 | 2 | 0% (not busy) |
| 0 | 3 | 0% (not busy) |
| 1 | 4 | Folded |
| 1 | 5 | Folded |
| 1 | 6 | Folded |
| 1 | 7 | Folded |

Table 5 shows the results of changing the VPM mode from the hardware thread distribution shown in Table 4, back to that of Table 2. This VPM mode change favors the performance goal of throughput and/or response time.

TABLE 5

Thread Utilization with Two Threads on Two Physical Processors

| Physical Processor | Hardware Thread | Thread Utilization |
|---|---|---|
| 0 | 0 | 30% |
| 0 | 1 | 0% |
| 0 | 2 | 0% |
| 0 | 3 | 0% |
| 1 | 4 | 30% |
| 1 | 5 | 0% |
| 1 | 6 | 0% |
| 1 | 7 | 0% |

Figure 3:
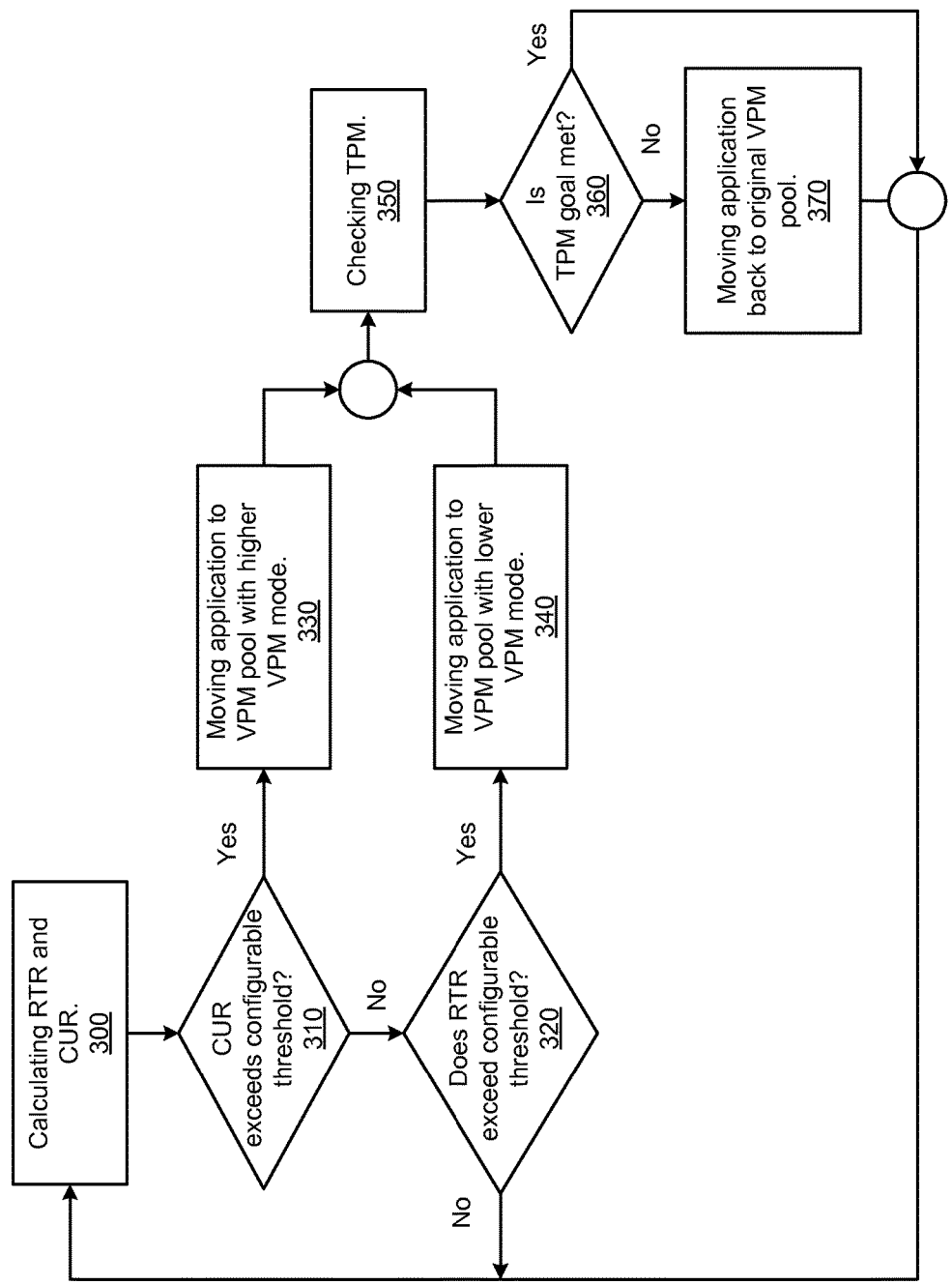
FIG. 3 illustrates an operational flowchart for dynamic virtual processor management using a virtual processor manager (VPM), according to various embodiments of the disclosure.

FIG. 3 shows a flowchart for a dynamic VPM whereby the hypervisor 240 (FIG. 2) in conjunction with the VPM subsystem dynamically alters the VPM mode setting based on the performance goals of the workload. One or more VPM pools may be defined, similar to the SPPs 210 of FIG. 2. Each VPM pool includes a dedicated set of physical processors that are not shared among VPM domains and that operate according to the algorithm of a specific VPM mode. Alternatively, the VPM pools may share physical processors from the PSPP 230 (FIG. 2). Performance goals may be defined for an application, for a group of applications having similar performance goals, or on a partition level. The application may be assigned to a first VPM pool which would operate in a VPM mode that is estimated to be the most beneficial to the application. The first VPM pool may be determined based on analysis of the historic performance metrics gathered using any of several well-known built-in operating system tools and commands (e.g., nmon, sar), third-party performance monitoring products, or from performance feedback hardware. Performance feedback hardware includes the portion of a physical processor that can measure and report counts such as cache hits and misses.

A dynamic VPM may use a metric for both utilization and input/output (I/O) wait time, and based on a configurable threshold dynamically change the VPM mode for an application. Beginning at 300, the CPU utilization (CUR) and response time ratio (RTR) are computed each second for each application. The CUR is a ratio of utilization to the total of system, user, and I/O wait time averaged over one second intervals. System time represents the amount of time a physical processor spends executing instructions on behalf of an operating system. User time represents the amount of time the physical processor spends executing instructions on behalf of a user, such as an application. I/O wait time represents the time during which a physical processor was idle and there was at least one outstanding I/O operation requested by a task scheduled on the physical processor. The RTR is a ratio of I/O wait time to the total of system, user, and I/O wait time averaged over one second intervals.

At 310 the computed CUR of an application is compared to a configurable threshold percentage for CUR for the VPM pool. The threshold percentage may be included as a parameter to the operating system scheduler. The configurable threshold percentage may be dynamically changed.

If the computed CUR exceeds the configured CUR threshold, at 330 the application is dynamically moved to a second VPM pool with a higher VPM mode. Assuming the VPM mode is implemented as the number of hardware threads per physical processor, higher or lower in this context refers to more or fewer hardware threads per physical processor. Dynamically moving the application to a VPM pool having a higher VPM mode indicates that the application's observed performance characteristics favor CPU utilization, as in the example of Table 3.

An application may also have its own configurable target performance metric (TPM) that may indicate a bias for a particular performance characteristic, such as throughput or response time. The TPM may be configured based on understanding the metrics and hardware thread dispatching behavior for the physical processor implementation, such as those shown in Tables 1-5. The TPM may be set through the operating system scheduler and may be dynamically changed. At 350 the TPM is checked against the calculated CUR. If at 360 the TPM goal is met by the current VPM pool, processing continues at 300 with computing a new CUR and RTR. If at 360 the TPM goal is not met by the current VPM pool, then at 370 the application is moved back to the original VPM pool from which it was moved at step 330.

Returning to step 310, if the computed CUR does not exceed the configured threshold, the computed RTR is compared to the configured RTR threshold. If at 320 the RTR does not exceed the configured RTR threshold, processing begins again at 300 where a new CUR and RTR are computed. However, if at 320 the computed RTR exceeds the configured RTR threshold, at 340 the application is dynamically moved to a VPM pool with a lower VPM mode. Dynamically moving the application to a VPM pool having a lower VPM mode indicates that the application's observed performance characteristics favor response time or throughput over utilization, as in the example of Table 2. If a TPM for response time is configured for the application, at 350 it is compared against the computed RTR at 360. At 370 the application is moved back to the VPM pool from which it was moved at 340 if the TPM goal is not met. If the TPM goal is met, then processing begins at 300 where a new CUR and RTR are calculated.

Figure 4:
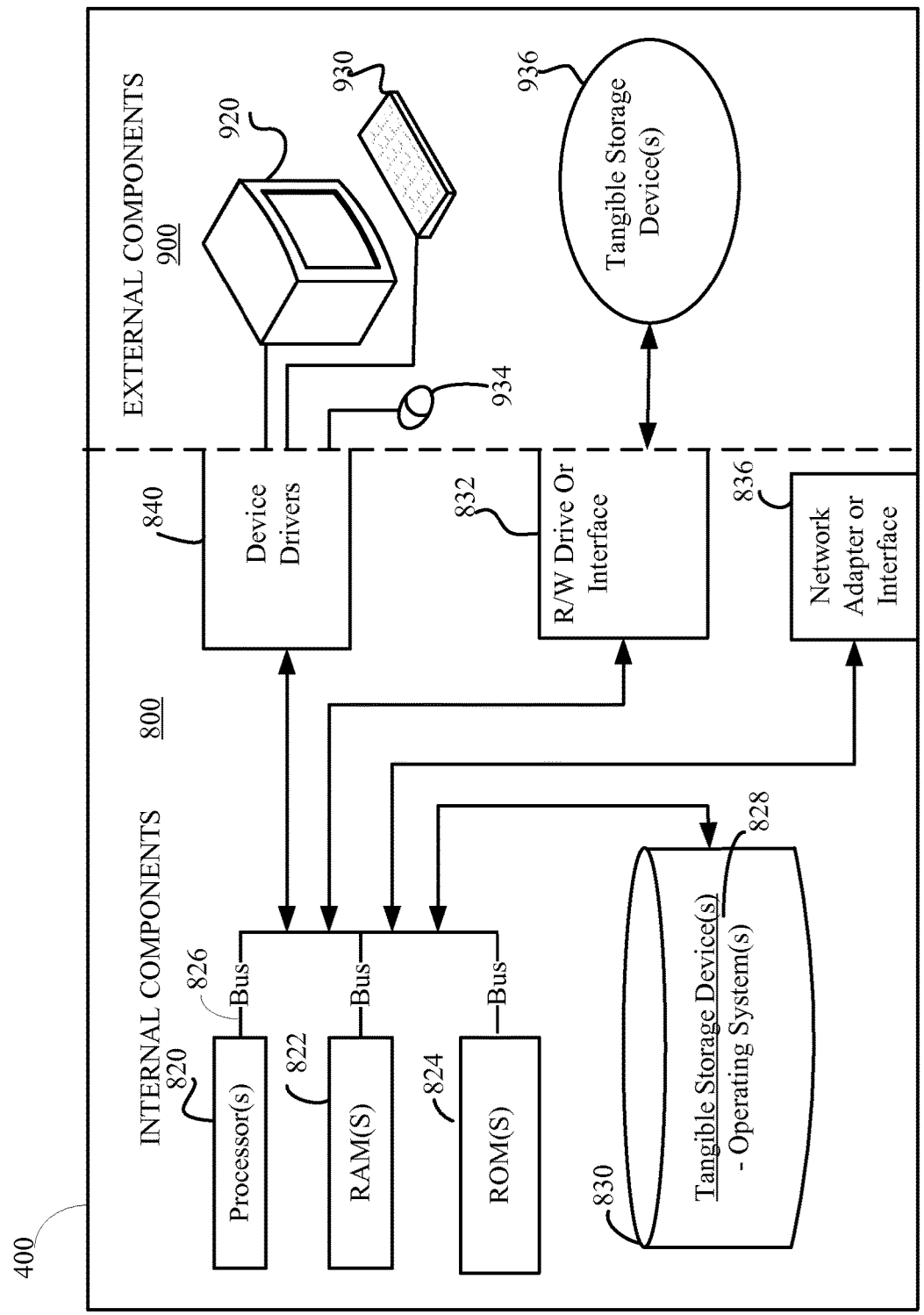
FIG. 4 is a block diagram of hardware and software of the computer environment according to an embodiment of the process of FIG. 3.

FIG. 4 illustrates an exemplary computing device 400 applicable for executing the algorithm of FIG. 3. Computing device 400 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method illustrated in FIG. 3; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for dynamic virtual processor management in a computer having a plurality of concurrent multi-threaded physical processors comprising:
    assigning an active logical partition to one of a plurality of shared processor pools, each shared processor pool having a virtual processor manager mode, wherein each virtual processor manager mode is defined by a number of concurrent hardware threads per physical processor, a distribution of the concurrent hardware threads when dispatched among the physical processors, and a maximum percent utilization of the concurrent hardware threads that triggers a dynamic moving of the active logical partition from the assigned shared processor pool to an other shared processor pool having a different virtual processor manager mode;
    calculating whether the active logical partition needs more capacity during a next scheduling interval, and based on a configured limit of the virtual processor manager mode associated with the shared processor pool, dispatching an additional hardware thread; and
    dynamically moving the active logical partition to the other shared processor pool having the associated virtual processor manager mode based on the observed performance characteristics of the active logical partition.

2. The method of claim 1, further comprising:
    comparing a target performance metric for a workload in the active logical partition to a calculated CPU utilization ratio or a calculated response time ratio; and
    dynamically moving the active logical partition from the assigned shared processor pool to another of the plurality of shared processor pools based on the target performance metric not being met or leaving the active logical partition in the assigned shared processor pool based on the target performance metric being met.

3. The method of claim 1, wherein a CPU utilization ratio is a ratio of utilization to the total of system, user, and input/output wait time averaged over one second intervals.

4. The method of claim 1, wherein a response time ratio is a ratio of input/output wait time to the total of system, user, and input/output wait time averaged over one second intervals.

5. The method of claim 1, wherein the plurality of shared processor pools each comprises one or more dedicated physical processors and wherein a number of concurrent hardware threads on each physical processor is configurable and dispatched by a hypervisor.

6. The method of claim 5, wherein the concurrent hardware threads are distributed on the one or more physical processors based on a configurable setting of the virtual processor manager mode.

7. A computer program product for dynamic virtual processor management in a computer having a plurality of concurrent multi-threaded physical processors comprising:
a virtual processor manager (VPM) of a computer operating system embodied on a computer readable storage medium, the VPM including program instructions executable by a processor, the program instructions comprising:
program instructions to assign an active logical partition to one of a plurality of shared processor pools, each shared processor pool having a virtual processor manager mode, wherein each virtual processor manager mode is defined by a number of concurrent hardware threads per physical processor, a distribution of the concurrent hardware threads when dispatched among the physical processors, and a maximum percent utilization of the concurrent hardware threads that triggers a dynamic moving of the active logical partition from the assigned shared processor pool to an other shared processor pool having a different virtual processor manager mode;
program instructions to calculate whether the active logical partition needs more capacity during a next scheduling interval, and based on a configured limit of the virtual processor manager mode associated with the shared processor pool, dispatching an additional hardware thread; and
program instructions to dynamically move the active logical partition to another shared processor pool based on the observed performance characteristics of the active logical partition.

8. The computer program product of claim 7, further comprising:
program instructions to compare a target performance metric for a workload in the active logical partition to a calculated CPU utilization ratio or a calculated response time ratio; and
program instructions to dynamically move the active logical partition to an other of the shared processor pools based on the target performance metric not being met.

9. The computer program product of claim 7, wherein the CPU utilization ratio is a ratio of utilization to the total of system, user, and input/output wait time averaged over one second intervals.

10. The computer program product of claim 7, wherein the response time ratio is a ratio of input/output wait time to the total of system, user, and input/output wait time averaged over one second intervals.

11. The computer program product of claim 7, wherein the plurality of shared processor pools each comprises one or more dedicated physical processors and wherein a number of concurrent hardware threads on each physical processor is configurable and dispatched by a hypervisor.

12. The computer program product of claim 11, wherein the concurrent hardware threads are distributed on the one or more physical processors based on a configurable setting of the virtual processor manager mode.

13. A computer system for dynamic virtual processor management in a computer having a plurality of concurrent multi-threaded physical processors comprising:
one or more processors, one or more computer-readable storage devices, and a plurality of program instructions stored on at least one of the one or more storage devices for execution by at least one of the one or more processors, the plurality of program instructions comprising:
program instructions to assign an active logical partition to one of a plurality of shared processor pools, each shared processor pool having a virtual processor manager mode, wherein each virtual processor manager mode is defined by a number of concurrent hardware threads per-physical processor, a distribution of the concurrent hardware threads when dispatched among the physical processors, and a maximum percent utilization of the concurrent hardware threads that triggers a dynamic moving of the active logical partition from the assigned shared processor pool to a different shared processor pool having a different virtual processor manager mode;
program instructions to calculate whether the active logical partition needs more capacity during a next scheduling interval, and based on a configured limit of the virtual processor manager mode associated with the shared processor pool, dispatching an additional hardware thread; and
program instructions to dynamically move the active logical partition to the different shared processor pool having the associated virtual processor manager mode based on the observed performance characteristics of the active logical partition.

14. The computer system of claim 13, further comprising:
program instructions to compare a target performance metric for a workload in the active logical partition to a calculated CPU utilization ratio or a calculated response time ratio; and
program instructions to dynamically move the active logical partition from the assigned shared processor pool based on the target performance metric not being met.

15. The computer system of claim 13, wherein a CPU utilization ratio is a ratio of utilization to the total of system, user, and input/output wait time averaged over one second intervals.

16. The computer system of claim 13, wherein a response time ratio is a ratio of input/output wait time to the total of system, user, and input/output wait time averaged over one second intervals.

17. The computer system of claim 13, wherein the plurality of shared processor pools each comprises one or more dedicated physical processors and wherein a number of concurrent hardware threads on each physical processor is configurable and dispatched by a hypervisor.

18. The computer system of claim 17, wherein the concurrent hardware threads are distributed on the one or more physical processors based on a configurable setting of the virtual processor manager mode.

* * * * *